(12) United States Patent
Linnartz et al.

(10) Patent No.: US 6,473,560 B1
(45) Date of Patent: Oct. 29, 2002

(54) COPY PROTECTION SCHEMES FOR COPY PROTECTED DIGITAL MATERIAL

(75) Inventors: Johan P. M. G. Linnartz; Johan C. Talstra, both of Eindhoven (NL)

(73) Assignee: U.S. Philips Corporation, Eindhoven (NL)

( * ) Notice: Subject to any disclaimer, the term of this patent is extended or adjusted under 35 U.S.C. 154(b) by 0 days.

(21) Appl. No.: 09/271,745

(22) Filed: Mar. 18, 1999

(30) Foreign Application Priority Data

Mar. 18, 1998 (EP) ............................................. 98200865

(51) Int. Cl.[7] ............................. H04N 5/91; H04N 7/167
(52) U.S. Cl. ......................................... 386/94; 380/201
(58) Field of Search ....................... 386/94, 95, 46–52, 386/113, 4, 21, 26; 380/201, 202, 203; 705/57, 58; H04N 5/91, 7/167

(56) References Cited

U.S. PATENT DOCUMENTS 5,907,443 A * 5/1999 Hirata 6,209,092 B1 * 3/2001 Linnartz

FOREIGN PATENT DOCUMENTS

| EP | 0256753 A2 | 2/1988 |
| EP | 0328141 A1 | 8/1989 |

* cited by examiner

*Primary Examiner*—Robert Chevalier
(74) *Attorney, Agent, or Firm*—Michael E. Belk

(57) ABSTRACT

Recent copy-protection schemes for digital video copy-protection rely on a pixel-watermark together with the presence of a 'ticket' to implement the 'copy-once' state of content. This ticket is designed to entitle the owner of a disk/tape to making one copy of digital content. We disclose a method to pass along this ticket with the video signal after content has been converted to the analog domain. This form of the ticket is called the analog ticket. The analog signal may be recorded on a legacy device that does not comply with the copy-protection scheme (e.g. ordinary VCRs). The analog ticket is designed such that it is automatically removed in these legacy devices. Next generation copies by compliant devices are made impossible. Three possible ways of embedding the ticket signal into the analog video signal are proposed.

18 Claims, 3 Drawing Sheets

COPY PROTECTION SCHEMES FOR COPY PROTECTED DIGITAL MATERIAL

BACKGROUND OF THE INVENTION

The invention relates to an apparatus for embedding a ticket signal in an analog video signal that has been obtained from converting a copy protected digital video signal into the analog domain, to a method for embedding the ticket signal in the analog video signal, to an analog video signal provided with the ticket, such that it will be removed or distorted when recording the analog video signal provided with the ticket on an analog VCR and subsequently reproducing the analog video signal therefrom, but does not distort normal reproduction of the analog video signal from that analog VCR, as well as to a record carrier provided with the video signal with the embedded ticket signal.

Prior art copy protection schemes are eg. the well known Macrovision copy protection method in which a selected waveform is added to the blanking interval of an analog video signal in order to prohibit recording and subsequent reproduction on/from an analog VCR. Reference is made in this respect to EP 256,753. Further, reference is made to EP 328,141, which discloses a what is called 'serial copy management system', which enables a restricted number (n) of copies to be made from the original or from a subsequent copy. The original material includes a count value representative of the value n. During a subsequent copy made from the original or from a copy, the count value included in the copied material is decreased by one, until the count value reaches the zero value, which subsequently blocks the making of further copies.

The proposed standard-specifications for new digital video media such as DVD-RAM (DVD=Digital Video/Versatile Disk) and possibly also VDR (Video Disc Recorder) will be endowed with a copy-protection mechanism. The schemes implement besides the obvious "copy-never" or "free-copy", the third "copy-once"/"copy no more" category of content. The latter possibility enables consumers to make a single copy of "copy-once" content, e.g. for back-up or time-shifting purposes. "Copy-once/copy-no more" is also required to comply with legislation in some regions of the world. The copied version receives the copy status "copy-no-more".

The basic copyright information is carried by embedding a watermark in the video content (in its most basic form slight alterations of luminance of predetermined pixels in the video material: invisible to the eye, but easily detectable in a playback device). There will be a different watermark for every one of the 3 copy categories. A watermark should be designed to be robust against a plethora of transformations: i.e. the watermark should still be detectable after basic image-processing (aperture filtering, 4:3⇌16:9 conversion, NTSC⇌PAL, letterboxing, digital→analog→digital), but also after serious hacking attempts. The watermark is a secret, only known to the embedder (the provider of the video-material).

In the case that the watermark describes the content as "copy-once"/"copy no more", some additional signal in the video stream ought to indicate which of the two generations: 'copy-once' or 'copy no more' describes the underlying video. Contrary to the watermark this signal should be changed in consumer devices in the process of copying. To accommodate this, various schemes have been proposed, introducing the so-called "ticket" concept The ticket consists of 64-bits which indicate whether a given disc/tape is the original (copy-once), or a recording of the original (copy no-more), that can no longer by copied by devices which adhere to the copy-protection rules. Of course this information could be encoded in just 1 bit, such with SCMS/CGMS copy-management rules, but this would make it also very easy for pirates to hack. Rather one chooses to relate 64 bits cryptographically to the underlying content. The number "64" is essentially dictated by the amount of effort required to 'crack' the cryptographic algorithm by brute force.

Beside the (future) players/recorders that adhere to this copyright information, the so-called 'compliant' recorders, there are those in the 'non-compliant' world: machines modified by hackers, but also the enormous extant base of analog VCRs. Because one of the requirements of a copy-protection mechanism is backwards compatibility, we should allow VCRs (operating under the specifications of formats such as VHS, Beta, Video-8, S-VHS, Hi-8 etc.) to be able to record 'copy-once' material. After copying, we want the video content now to be 'copy-no more'. Compliant recorders should not be able to make a $3^{rd}$ generation copy. Consequently, the ticket T should be designed in such a way that it is automatically stripped by these existing non-compliant recorders.

SUMMARY OF THE INVENTION

The objective thus is that analog video is recorded on tape together with the ticket, on a VCR which knows nothing about copy-protection. During playback of the tape, the analog video should reappear, but the ticket should be absent from it, see FIG. 1.

It is therefore the purpose of the invention to propose a number of low bit-rate information channels in an analog CVBS (Composite Video Blanking/Synchronization) signal of either NTSC-, PAL- or SECAM-signature, which are automatically removed upon recording or playback using analog consumer-grade VCRs. It would be desirable if the ticket would not get removed until playback, ie. in FIG. 1, removal takes place in VCR(OUT) rather than VCR(IN). Otherwise, future compliant analog VCRs would not be able to play 'copy no more' tapes: once they detect a watermark claiming "copy-once"/"copy no more" status, they interpret absence of a ticket as a hack and their playback is stopped.

BRIEF DESCRIPTION OF THE DRAWINGS

These and other aspects of the invention will be further explained hereafter in the figure description. In the figure description shows FIG. 1 the idea behind the invention, namely, the recording of the analog video signal provided with the ticket on an analog VCR, such that upon reproduction, the video signal is not distorted but the ticket has disappeared, FIG. 2 the embedding of a ticket in the form of an amplitude modulated Y-signal in the analog video signal, FIG. 3 an apparatus for embedding a ticket in the analog video signal in accordance with the first proposal, FIG. 4 oscilloscope traces of the ticket before recording on a VCR and after playback from that VCR, the tickets being embedded in accordance with the third proposal, and FIG. 5 an apparatus for embedding a ticket in the analog video signal in accordance with the third proposal,

DESCRIPTION OF THE PREFERRED EMBODIMENTS

Figure 1:
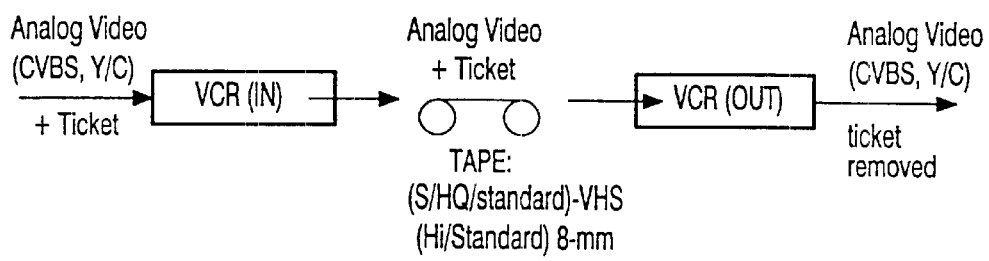

It is assumed that the analog video originates from the analog output of a DVD player, or emerges at the end of a broadcast chain. Note, that the "analog ticket" has nothing to do with methods that prevent regular VCRs from recording analog video (such as existing Macrovision methods). Since the content provided to the VCR is copy once, recording is explicitly allowed. What should be achieved is that subsequent copy-attempts by compliant devices are thwarted.

The channels for passing along the ticket are characterized by two features:
(a) time of transmission (e.g. line 21, line 624 etc.)
(b) physical carrier (e.g. horizontal synch pulse, colour burst etc.).

Those two items will now be discussed first.

As regards (a) above: to ensure that the extra information is not visible to viewers, yet at the same time allows for a cheap implementation in consumer devices, attention will be given to two options:
i. As a first option, the vertical blanking interval could be used for accommodating the ticket. The vertical blanking interval (VBI) comprises the lines 1–23, 311–335 and 623–625, in 50/625 PAL/SECAM and the lines 1–21, 261–283, 523–525 for 60/525 NTSC. Of these, lines 1–10,311–321, 623–625 (PAL/SECAM), and 1–10, 261–267, 523–525 (NTSC) are reserved for receiver timing Legalization, (B-Y)/(R-Y) line synchronization in SECAM etc.), so that they should remain unmodified.

NB. In NTSC, line 21 is not part of the VBI, but, as it is reserved for close captioning and not for active video, it is labelled above as belonging to the VBI.

ii. As a second option, the 3% of the active video that usually are not projected on consumer-grade monitors due to overscanning can be used for accommodating the ticket.

Both choices carry advantages and disadvantages: The information carried in the VBI is not always preserved in video-conversion equipment (say PAL→NTSC) which may be present in the broadcast chain for internationally distributed programs. But within one transmission standard, the VBI is a very efficient invisible channel as demonstrated by 20-year old services such as Teletext (NB. In view of this, it may seem attractive to attach the ticket to a program just as an ordinary NABTS/WST-teletext page. This seems, however, dubious, since consumer-grage VCRs with 5 MHz Y-bandwidth, such as S-VHS, will record and replay this signal untouched) and Close Captioning, and more recently Intel's HTML-based Intercast technology. Moreover, services like Teletext are transmitted a synchronously, ie. it is decided on a field-by-field, or even line-by-line basis, whether or not to broadcast it on VBI lines. When a line is being used, a specific synchronization sequence is transmitted at the start of the active video of that line. If the broadcaster wants to assert his or somebody else's copyrights on the transmitted content, yet allowing one copy (e.g. for time-shifting purposes) he transmits the appropriate ticket and only has to delay transmitting a particular teletext line one frame. Lines 23 (PAL) or 22 (NTSC) may be used for flagging 16:9 mode (WSS in PAL+transmissions); line 19 (NTSC) or 318 (PAL/SECAM) are also claimed for Ghost cancellation. Care would have to be taken that the transmitted ticket does not trigger any of the logic associated with this functionality and vice versa. The use of line 23 in PAL for WSS (and gun calibration?) may be attractive. Finally, tickets in the VBI are automatically stripped by digital VCRs (D-VCR) which store only the active part of the video.

On the other hand the 3% overscan region can be expected to survive almost all conversions and be transmitted universally. The disadvantage of using this part of the video, is that on some displays these lines may end up being visible (depending on temperature etc.; also PC-monitors when used as TV). In addition, noise filtering or other manipulations of the active video in the broadcast chain may also destroy any ticket information contained therein. To summarize:

| | + + | − − |
|---|---|---|
| VBI lines | _Easy to integrate for a compliant broadcaster. | _Broadcaster needs to be aware: must be spliced into existing TXT, CC etc. signals<br>_May be deleted in International Broadcast chain |
| 3% overscan | _Will survive an entire broadcast chain<br>_No extra hardware in DVD player necessary. | _Noise reduction/format conversion/filtering on active video may harm ticket in this region.<br>_Could be visible on some monitors (e.g. underscanned PC monitor)<br>_Does not get removed in Digital VCR |

Figure 2:
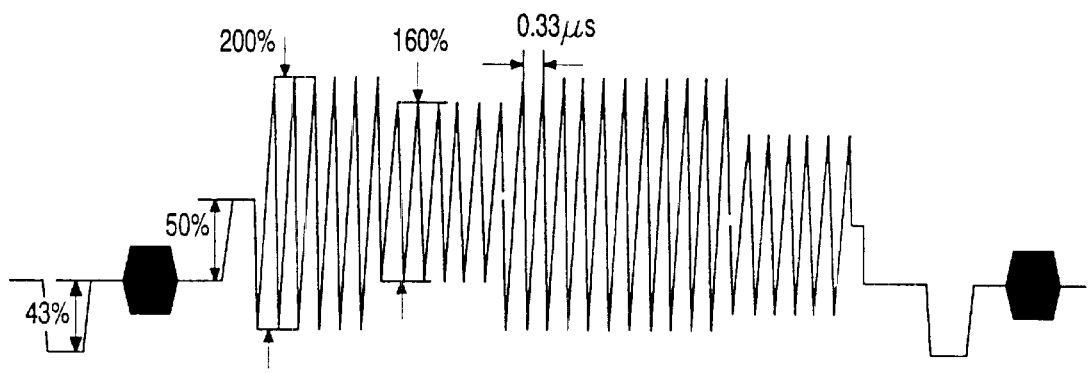

A first proposal is to transmit during VBI or the 3% overscan lines an Amplitude Modulated Y-signal, with a carrier frequency of approx. 3–4 MHz, and high amplitude, with DC-level 50% (gray). For instance, with blanking level=0%, peak white=100%, synchronization level=−43%: binary "0" has amplitude of 80% and "1" an amplitude of 100%. This means that peak levels of these signals will be 129% resp. 150%. An example of a ticket, embedded in this way, is shown in FIG. 2. The example shows the embedding of a bit sequence '10110' of the ticket in a line of the video signal, by AM-modulating a high-frequency, high amplitude Y-signal (not to scale). During recording, high (spatial) frequencies are amplified in the VCR (the so-called pre-emphasis), to compensate for undesirable properties of magnetic tape. To limit the frequency excursions of the FM modulator that records the Y-signal, the pre-emphasized signal is clipped before recording. This clipping removes any high-amplitude information in Y.

Figure 3:
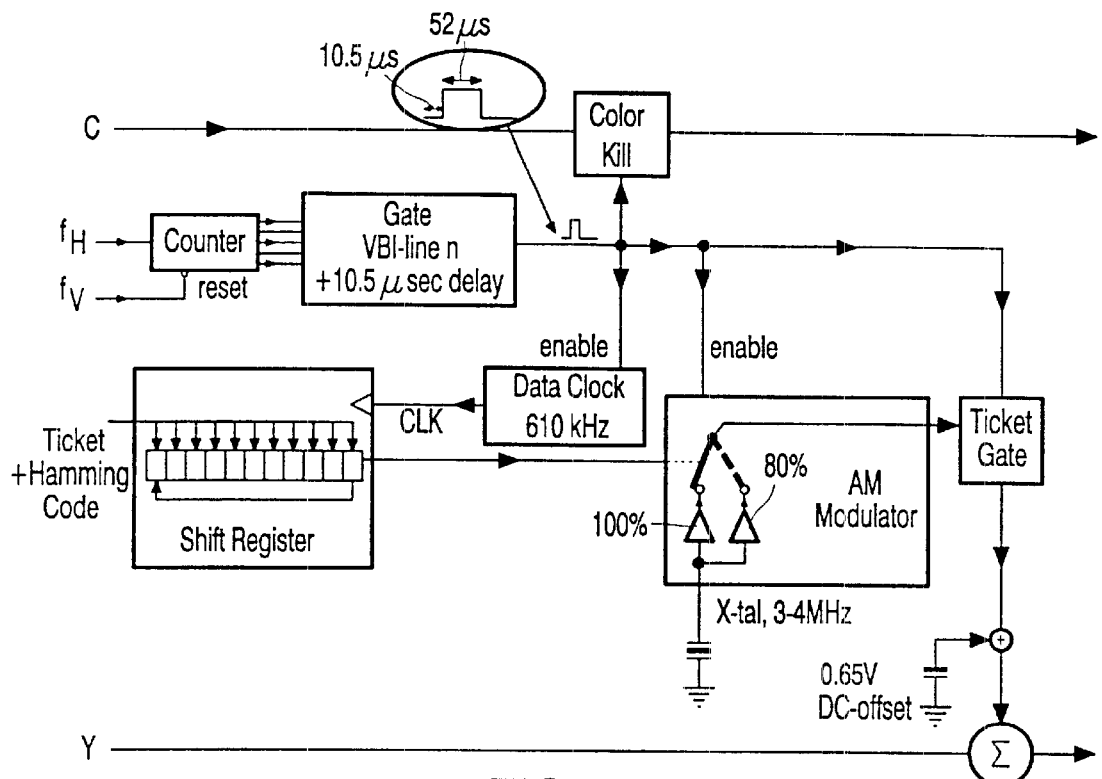

FIG. 3 shows an embodiment of an apparatus for embedding the analog-ticket as shown in FIG. 2 in the analog video signal. The embedder of FIG. 3 embeds the analog ticket in line n of the video signal. The data bits are transmitted at 614 kHz using 50% DC-offset and amplitudes 80% and 100% to represent "0" and "1". This allows for approximately 32 bits/line. The "Gate VBI line n", is a monstable multivibrator which emits a pulse, as soon as its input sees the number n.

A second proposal is to shift the phase of the colour burst in a predetermined line over 180°.

At the beginning of every line, before the active part of the line, the broadcaster transmits the colour burst: 10 to 12 cycles of the colour subcarrier frequency, $f_{SC}$ which has been fixed to 4.433618.75 MHz (for PAL) or 3.579545 MHz (for NTCS). The receiver synchronizes an on-board oscillator in frequency and phase to this burst, and uses it to decode the ensuing U,V (also called R-Y,B-Y) (PAL), or I,Q (NTCS) colour-signals which have been quadrature amplitude modulated (PAL/NTSC) onto the colour subcarrier.

While recording on a magnetic tape in a VCR, the colour signals which modulate the colour subcarrier, are shifted down from the upper part of the spectrum (around $f_{SC}$) to the lower part of the spectrum and centred around $f_L \approx 625$ kHz (PAL), 690 kHz (NTSC). These figures are for VHS. For Beta, Hi-8 and S-VHS, the sub-carrier frequencies lie in the same range (between 550 and 750 kHz).

To be precise: if the analog input of the VCR sees a colour signal with a burst-frequency $f_{SC}{}'$ and horizontal line frequency $f_H'$ (both not necessarily equal to those specified in the standard), the colour burst frequency on tape should be $f_U=N.f_H'$, N being equal to 40+1/8 for VHS and being equal to 47−1/8 for 8 mm. The burst phase of $f_U$ is locked to $f_{SC}'$.

The above described procedure is called 'colour-under' recording. On playback the VCR colour-under electronics will translate the colour signal from tape back to its original range around $f_{SC}$ in the upper part of the spectrum by mixing it in a heterodyne mixer with the sum frequency $f_A \approx f_{SC}+f_U$. The playback $f_{SC}$ is generated by a crystal oscillator, and $f_u$ is generated by a VCO which is locked to the colour-burst coming from tape. Variations in the design of the so-called sub-converter and the main converter exist, but there are always two oscillators, one of which is a stable X-tal reference oscillator and the other is locked to a (multiple of) the burst frequency.

Timing instabilities (jitter) in the tape transportation system have a disastrous influence on the subcarrier phase and therefore the colour quality. Two phase comparison loops, a coarse control loop and a fine control loop, quickly compensate for these instabilities, by adjusting the heterodyne mixer frequency to produce a burst that comes out to the standard 4.433618.75 or 3.579545 MHz. Note that some intentional modulation of the burst phase/frequency in the input signal to the VCR will be lost in the output by this locking of the output burst to a reference crystal.

The fine control loop "slowly" adjusts the heterodyne mixing frequency $f_A$ by comparing the phase difference of the reference crystal oscillator and the up-converted burst from tape, averaged over a few lines.

The coarse control loop responds "quickly" to large phase differences. To understand its working, one should know that in VHS and its descendants, the phase of the colour subcarrier, and thus the burst as recorded by head-A (one of the two recording heads present in the VCR) is advanced by 90°, every horizontal line; for PAL this happens in addition to the standard ±135° burst-alternation. For head-B (the other recording head in the VCR) no extra phases are introduced. This is done to reduce chroma-crosstalk between adjacent tracks. It should be noted here, that in the 8-mm system, the roles of heads A and B are interchanged.

Now on playback, when comparator in the coarse control loop in the colour synchronization circuitry notices a large phase difference it can respond in two ways: the phase difference is big because (a) a large error has occurred; in that case the coarse control loop shuts off the burst and colour-signal for that line.

(b) the oscillator is in the wrong phase of the 0°→90°→180°→270°→0° set of jumps; in that case, the coarse control loop advances the onboard oscillator for $f_u$ in steps of 180° (or sometimes 90°) until locking occurs. This is called the 4Φ-selector.

To transmit a "0", advance the burst by 180° on a fixed line n (say n=18). To transmit a "1", advance the burst by 180° on line n+1. This "0" or "1" is detected by measuring the phase of the burst on line n+1. There are two ways in which this information is distorted on playback:

1. The coarse control loop sees a 180° $f_{SC}$-phase error, and responds by advancing the heterodyne frequency $f_u$ by 90° or 180°.

2. Even if the coarse control loop does not respond at all, there is a colour comb-filter, present in every VCR, to reduce the cross-talk between adjacent tracks. This 2H comb-filter puts out the average of line n and n−2 (for PAL; for NTSC: 1H, average of lines n and n−1). If the burst on line n is 180° advanced, that will average to 0 with the burst on line n−2.

In this way, one or two 2 bits per frame can be transmitted. The number of bits is limited because it takes the coarse control loop a few lines (typically 5–8) to recover, and obviously this recovery needs to take place before video lines are transmitted which are viewable on the screen.

The following table shows what the amplitude A and phase φ of the burst on line n+1 will be after playback from a VCR with and without a responding coarse control loop.

| Transmitted bit | 4Φ-selector advances 180° | | | | | | 4Φ-selector does not act | | | | | |
|---|---|---|---|---|---|---|---|---|---|---|---|---|
| | 2H Comb | | 1H Comb | | No Comb | | 2H Comb | | 1H Comb | | No Comb | |
| | A | θ | A | θ | A | θ | A | θ | A | θ | A | θ |
| "0" | 0 | — | 0 | — | $A_0$ | 180° | 0 | — | 0 | — | $A_0$ | 180° |
| "1" | 0 | — | $A_0$ | 180° | $A_0$ | 180° | $A_0$ | 0° | 0 | — | $A_0$ | 0° |

The above table shows the amplitude and the phase-shift of the burst on line n+1 after transmitting a "0" or a "1" bit, after recording and playing back the bits by an analog VCR with various PLL-configurations. In this table, $A_0$ is the normal burst-amplitude (approx. 43%). The (pathological case of the) last column shows what is measured on line n+1 without going through a VCR (i.e. directly at the output of say a DVD player). Notice that in none of the VCR configurations both "0" and "1" can be detected reliably upon playback.

An example: transmit a "0" to a VCR with a 1H comb-filter and a 4Φ-selector that advances in steps of 180°. Because of the "0", the burst on line n is 180° ahead and the burst in line n+1 is 0° ahead. On playback, the 4Φ-selector advances the burst on line n+1 by 180° upon detecting the "bad" burst on line n. Then the 1H comb filter averages this with line (n+1)−1=n, which was already 180° ahead, so the result is a burst with normal amplitude and 180° phase-shift.

A third proposal is based on the relationship that normally exists between the line frequency $f_H$ and the subcarrier frequency $f_{SC}$. In a particular line in the VBI or the 3% overscan region, a signal is transmitted with approximately the same frequency as the colour subcarrier, $f_{SC}$, which is phase-modulated with the bits of the ticket. I.e. "0" and "1" correspond to two colours, say at 0° and 90° in U-V space. The frequency of the ticket signal should be very close to (284−1/4) $f_H$+25 Hz(PAL) or (455/2)×$f_H$ (NTSC). However the following rules should be taken into account:

For PAL:

(a) this ticket-signal is transmitted only during even frames, not during odd frames, and (b) the ticket signal is inverted every $2^{nd}$, $6^{th}$, $10^{th}$ etc. frame.

For NTSC (a) this ticket signal is transmitted during all frames, and
(b) the ticket signal is inverted every $2^{nd}$, $4^{th}$, $6^{th}$ etc. frame.

The inversion of the ticket-signal corresponds to assigning two new colours to "0" and "1" which are shifted 180° ahead. As a result of the fact that the ticket signal is locked to $f_H$, the ticket signal has a fixed phase with respect to the horizontal synchronization pulse, on that line: i.e. on an oscilloscope using this horizonal synch pulse as trigger, the ticket-signal is steady. If the inversion in step b were not performed, the ticket-signal would appear together with its 180°-shifted version, because of the fractional relation between $f_{SC}$ and $f_H$.(for PAL, after two frames, the colour subcarrier on the same line has picked up a phase-delay of 180°, whilst for NTSC, after one frame, the colour-subcarrier on the same line has picked up a phase-delay of 180°). The ticket signal is detected by averaging this line over a number of frames.

This ticket signal is removed upon recording as follows: the frequency on which the ticket is phase-modulated is basically the colour-subcarrier. The VCR will interpret the ticket-signal as a sequence of colours. During playback, the VCR will lock this "Colour-signal" to a reference crystal-oscillator at $f_{SC}$. The horizontal line frequency $f_H$ however, is unstable, because of jitter in the mechanics of the tape-transportation system. Therefore, on playback, the ticket signal no longer bears any fixed phase-relationship to $f_H$ and when added up over several frames will average to 0.

Figure 4:
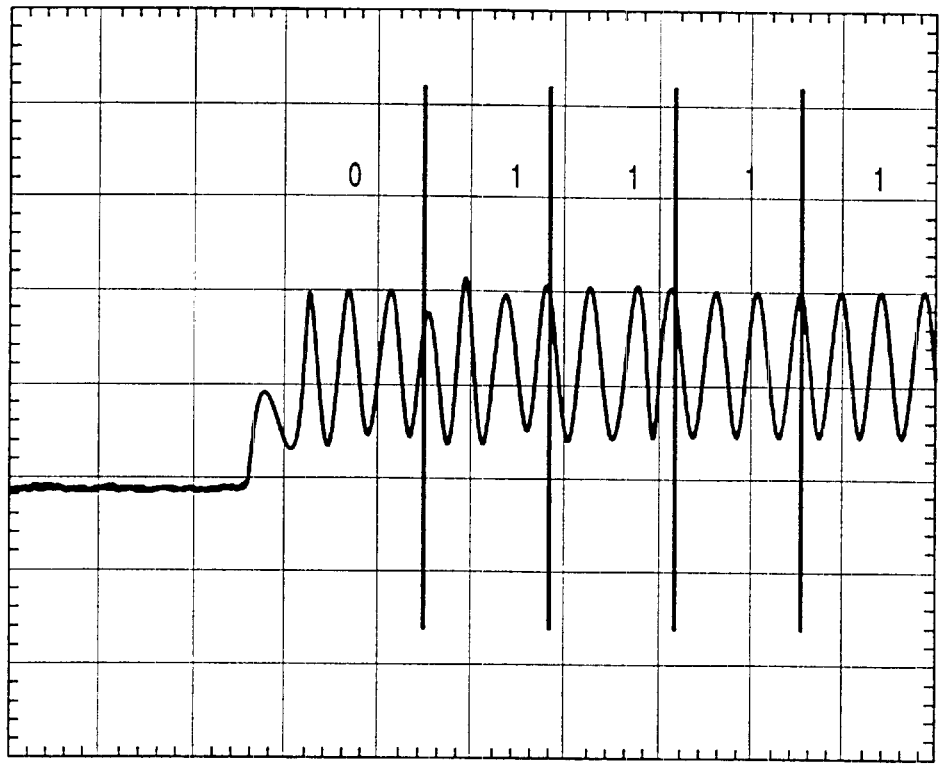
Figure 4:
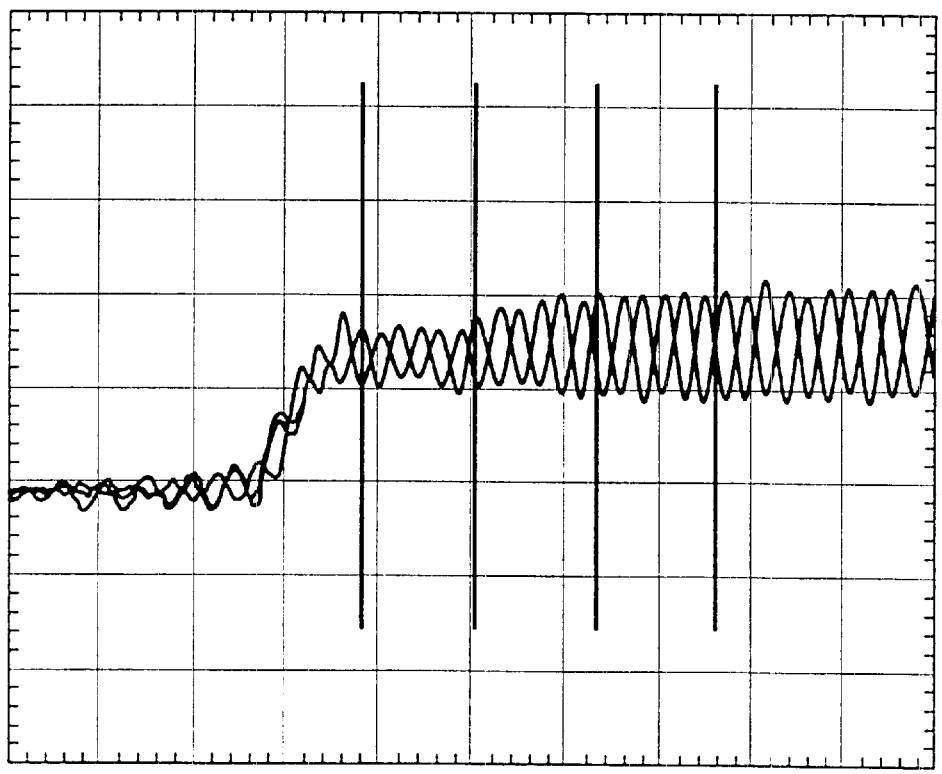

FIG. 4 shows oscilloscope traces of the ticket before recording on a VCR and after playback from that VCR. In FIG. 4, the modulation parameter is "1" is +45°, "0" is −45°. At the top: before recording on a VCR; at the bottom: after playback from that VCR. The vertical dashed lines indicate bit-boundaries: the places where the phase of the carrier may be changed to encode bit. It is clear from the picture at the top that all traces fall on top of each other, whereas in the picture at the bottom the carrier jitters back and forth, and averages away.

Figure 5:
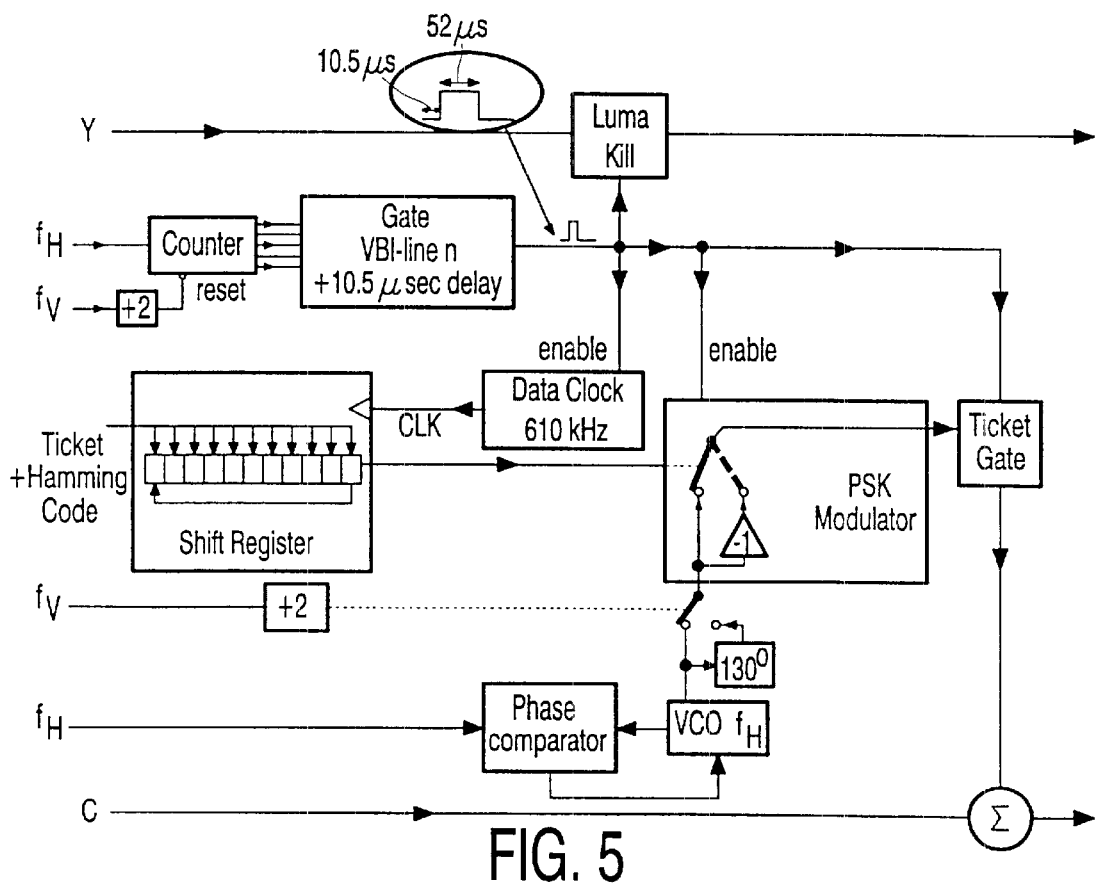

FIG. 5 shows an embodiment of an apparatus for embedding the ticket as per the third proposal into the analog video signal. With the embedder of FIG. 5, the data bits are transmitted at 614 kHz using 0° and 180° to represent "0" and "1". This allows for approximately 32 bits/line. The "÷2" block in FIG. 5 is for NTSC, and should become a "÷4" block for PAL. The "Gate VBI line n" block in FIG. 5, is a monstable multivibrator which emits a pulse, as soon as its input sees the number n.

For the transmission of the ticket in accordance with the second and third proposal, it is recommended to set the luminance-signal Y on the ensuing line to zero. If the luminance signal in the line is not zero, this does not hinder the methods, but taking the luminance signal equal to zero will merely mask any potential artifacts.

The tables below summarize and list the advantages and disadvantages of the three proposals described above.

| | Medium | Aggressor | Method |
|---|---|---|---|
| 1 | AM a carrier ≈ 4 MHz in Y-space at high amplitude (e.g. "0" = 1.2 V; "1" = 1.34 V) | Pre-emphasis + limiter-circuit | R-IN |
| 2 | Modulate Colour Burst phase | 0°/90°/180°/270° rotary 4Φ-selector and/or comb-filter. | R/D(?)-OUT |

-continued

| | Medium | Aggressor | Method |
|---|---|---|---|
| 3 | PSK $f_{sc}$ + inversion on successive frames | Jitter in mechanical tape-transport, i.e. $f_H$ | R/D(?)-OUT | where R means 'removed' and D means 'distorted'.

| | | + + | − − |
|---|---|---|---|
| 1 | High freq. & high volume Luma | _Simple/cheap _Works with SECAM _High bit-rate | _Clipping may be device dependent. |
| 2 | PSK Burst | _Does not survive MPEG/D-VCR, even when in the 3% overscanned region of active video.2 | _On replay phase comp. may be too slow and leave triggerable version of ticket. _Lower bit-rate May cause colour errors in older equipment (w/o quick phase restore). _CH-1/CH-2 problem _No colour burst in SECAM |
| 3 | PSK $f_{sc}$ + inversion on successive frames | _High bit-rate | _May not work in SECAM, _Averaging over frames may be expensive (memories etc.). _Survives a D-VCR |

As regards security, the following comments could be made. The ticket could be spliced into the analog signal upon playback by pirates. This could be prevented by relating the ticket to specific properties of the active video of the frame in which it is embedded. Upon playback, the analog video is mutilated (eg. the high frequency colours are stripped, but also loss of Y-resolution would work), and the illegally inserted ticket would no longer correspond to the underlying video.

The requirements on an analog ticket can now be summarized as follows. Tickets should not be recognizable by compliant DVD recorders after a recording and subsequent reproduction step on/from an analog VCR, such as disclosed in FIG. 1. The ticket may be rendered unreadable by VCR (IN) (during recording) or in VCR (OUT) (during playback). Furthermore the ticket may be completely removed, or merely distorted (e.g. shifted in frequency). In order of preference:

| | VCR (IN) | VCR (OUT) |
|---|---|---|
| Removed (R) | − | ++ |
| Distorted (D) | − − | + |

Complete removal beats distortion, to make it more difficult for hackers to restore the ticket by hand. Deletion in VCR(OUT) rather than VCR(IN) is preferable because a compliant DVD-recorder or future VCR will not replay (otherwise legal) copy-once material without a ticket.

The ticket consists of 64 bits which should be transmitted approximately once per 10 seconds. Because of the analog nature of the channel, ECC should be applied and will roughly double the number of bits to 128.

It should be difficult (cryptographically/computationally) to reinsert the ticket into analog video.

Transmission of the ticket in analog video should require as little hardware as possible beyond that already in place to convert from MPEG to CVBS.

What is claimed is:

1. Apparatus for embedding a ticket signal in one or more lines of an analog video signal, the apparatus comprising first input means for receiving the analog video signal, second input means for receiving the ticket signal, means for embedding the ticket signal into the one or more lines of the video signal, characterized in that the means for embedding is adapted to embed the ticket signal by adding an amplitude modulated signal with a predetermined carrier frequency in said one or more lines, a bit in the ticket signal of a first binary value being represented by a first predetermined amplitude in the amplitude modulated signal, a bit in the ticket signal of a second binary value being represented by a second predetermined amplitude in the amplitude modulated signal.

2. Apparatus as claimed in claim 1, characterized in that the predetermined carrier frequency has a value between 3 and 4 MHz.

3. Apparatus as claimed in claim 1, characterized in that the first predetermined amplitude is substantially equal to 200% peak-peak and the second predetermined amplitude is substantially equal to 160% peak-peak, where 100% peak-peak is equivalent to the value distance between blanking level and peak white in the luminance signal.

4. Apparatus for embedding a ticket signal in one or more lines of an analog video signal, the apparatus comprising first input means for receiving the analog video signal, second input means for receiving the ticket signal, means for embedding the ticket signal into the one or more lines of the video signal, characterized in that the means for embedding is adapted to embed the ticket signal by changing the phase of the colour bursts in one of two subsequent lines in the video signal, a bit in the ticket signal of a first binary value being represented by the colour burst in the first one of the two subsequent lines in the video signal being changed in phase, a bit in the ticket signal of a second binary value being represented by the colour burst in the second one of the two subsequent lines in the video signal being changed in phase.

5. Apparatus as claimed in claim 4, characterized in that the means for embedding is adapted to change the phase of the colour burst over 180°.

6. Apparatus for embedding a ticket signal in one or more lines of an analog video signal, the apparatus comprising first input means for receiving the analog video signal, second input means for receiving the ticket signal, means for embedding the ticket signal into the one or more lines of the video signal, characterized in that the means for embedding is adapted to embed the ticket signal by adding a predetermined carrier frequency that is phase modulated with the bits in the ticket signal in the one or more lines of the analog video signal, a bit of the ticket signal of a first binary value being represented by the carrier frequency being phase modulated by a first phase angle, a bit of the ticket signal of a second binary value being represented by the carrier frequency being phase modulated by a second phase angle.

7. Apparatus as claimed in claim 6, characterized in that the predetermined carrier frequency is substantially equal to the colour subcarrier frequency.

8. Apparatus as claimed in claim 6, characterized in that the said first phase angle substantially equals 0° and the said second phase angle substantially equals 90°.

9. Apparatus as claimed in claim 6, characterized in that the means for embedding is adapted to add the ticket signal to one or more lines of even frames in the video signal only.

10. Apparatus as claimed in claim 6, characterized in that the means for embedding is adapted to invert the ticket signal embedded in every m-th frame in the video signal, where m is an integer equal to 2.

11. Apparatus as claimed in claim 6, characterized in that the means for embedding is adapted to invert the ticket signal embedded in the (2+m)-th frame of the video signal, where m is an integer equal to 0, 4, 8, 12, . . .

12. Apparatus as claimed in claim 1, characterized in that the said one or more lines are lines included in the vertical blanking intervals of the video signal.

13. Apparatus as claimed in claim 1, characterized in that the said one or more lines are lines in the overscan portion of the active lines in the video signal.

14. Apparatus as claimed in claim 1, characterized in that it further comprises write means for writing the video signal with the embedded ticket signal on a record carrier.

15. Method of embedding a ticket signal in one or more lines of an analog video signal, carried out in the apparatus as claimed in claim 1.

16. Method as claimed in claim 15, characterized in that it further comprises the step of recording the the video signal with the embedded ticket signal on a record carrier.

17. Record carrier obtained with the method of claim 16, having the video signal with the embedded ticket signal recorded on it.

18. Analog video signal obtained with the method of claim 15, having the ticket signal embedded in it.

* * * * *